United States Patent
O'Brien et al.

(10) Patent No.: US 10,937,009 B1
(45) Date of Patent: Mar. 2, 2021

(54) PROVISIONING DISTRIBUTED LEDGER SOFTWARE

(71) Applicant: Virtustream IP Holding Company LLC, Bethesda, MD (US)

(72) Inventors: Sean C. O'Brien, Atlanta, GA (US); Maik A. Lindner, Marietta, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 575 days.

(21) Appl. No.: 15/802,939

(22) Filed: Nov. 3, 2017

(51) Int. Cl.
- *G06Q 40/00* (2012.01)
- *G06Q 20/10* (2012.01)
- *G06Q 20/38* (2012.01)
- *H04L 29/08* (2006.01)
- *H04L 9/06* (2006.01)

(52) U.S. Cl.
CPC .......... *G06Q 20/10* (2013.01); *G06Q 20/382* (2013.01); *H04L 9/0637* (2013.01); *H04L 67/02* (2013.01); *H04L 67/10* (2013.01)

(58) Field of Classification Search
CPC ...... G06Q 40/00; G06Q 20/10; G06Q 20/382; H04L 9/0637; H04L 67/02; H04L 67/10
See application file for complete search history.

(56) References Cited

U.S. PATENT DOCUMENTS

| | | | | |
|---|---|---|---|---|
| 2017/0243212 A1* | 8/2017 | Castinado | ............. | H04L 9/3236 |
| 2017/0330159 A1* | 11/2017 | Castinado | ............. | G06Q 20/02 |
| 2018/0114205 A1* | 4/2018 | Thomas | ................. | G06Q 40/02 |
| 2018/0137306 A1* | 5/2018 | Brady | ................... | H04L 9/0643 |
| 2018/0167217 A1* | 6/2018 | Brady | ................... | H04L 9/3247 |
| 2018/0219676 A1* | 8/2018 | Mattingly | ............... | H04L 63/08 |
| 2019/0018984 A1* | 1/2019 | Setty | ...................... | H04L 63/123 |
| 2019/0108586 A1* | 4/2019 | Jayaram | ................. | G06Q 40/04 |
| 2019/0386969 A1* | 12/2019 | Verzun | ................ | H04L 63/0464 |

OTHER PUBLICATIONS

The Future of Locksmithing, Hunt, Steve. Locksmith Ledger International; Fort Atkinson vol. 65, Iss. 6, (Jun. 2005): 52-53. (Year: 2005).*

* cited by examiner

*Primary Examiner* — Lalita M Hamilton
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a portion of at least one of multiple cloud-based systems. The platform further comprises a ledger analysis module configured to identify common operation parameters associated with multiple ledger software offerings and infrastructure components required by the ledger software offerings. The platform also comprises a ledger adapter module configured to map the common operation parameters to multiple offering-specific ledger adapters, and a ledger infrastructure creation module configured to create infrastructure for implementing the ledger software offerings based on the identified infrastructure components. Further, the platform comprises a ledger deployment module configured to deploy the ledger software offerings onto the platform and to provision one of the ledger software offerings through the platform based on user preferences.

20 Claims, 6 Drawing Sheets

US 10,937,009 B1

PROVISIONING DISTRIBUTED LEDGER SOFTWARE

FIELD

The field relates generally to information processing systems, and more particularly to techniques for providing blockchain services in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for a software platform that can stand-up multiple distributed and distinct ledgers via a single abstraction layer.

SUMMARY

Illustrative embodiments of the present invention provide information processing systems configured to provision, monitor, and deprovision distributed ledger software.

In one embodiment, an apparatus comprises a processing platform that includes a plurality of processing devices each comprising a processor coupled to a memory. The processing platform is configured to implement at least a portion of at least one of multiple cloud-based systems. The processing platform further comprises a ledger analysis module configured to identify common operation parameters associated with multiple ledger software offerings and to identify one or more infrastructure components required by the multiple ledger software offerings, wherein the multiple ledger software offerings are distributed across the multiple cloud-based systems. The processing platform also comprises a ledger adapter module configured to map the identified common operation parameters to multiple offering-specific ledger adapters, wherein each respective offering-specific ledger adapter corresponds to a particular ledger software offering, and a ledger infrastructure creation module configured to create at least a portion of multiple infrastructures for implementing the multiple ledger software offerings based on the one or more identified infrastructure components. Further, the processing platform comprises a ledger deployment module configured to deploy the multiple ledger software offerings onto the processing platform and to provision, to at least one user, one of the multiple ledger software offerings through the processing platform based on one or more preferences of the at least one user.

Illustrative embodiments can provide significant advantages relative to conventional approaches of standing-up individual ledgers manually. For example, challenges associated with such manual techniques are overcome through the design and implementation of distributed ledger hosting capabilities as a service software platform. Such a platform includes a generic application programming interface required to stand-up a distributed ledger, provisioning on a specific cloud implementation, metric-gathering at run-time, and deprovisioning on a specific cloud implementation.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
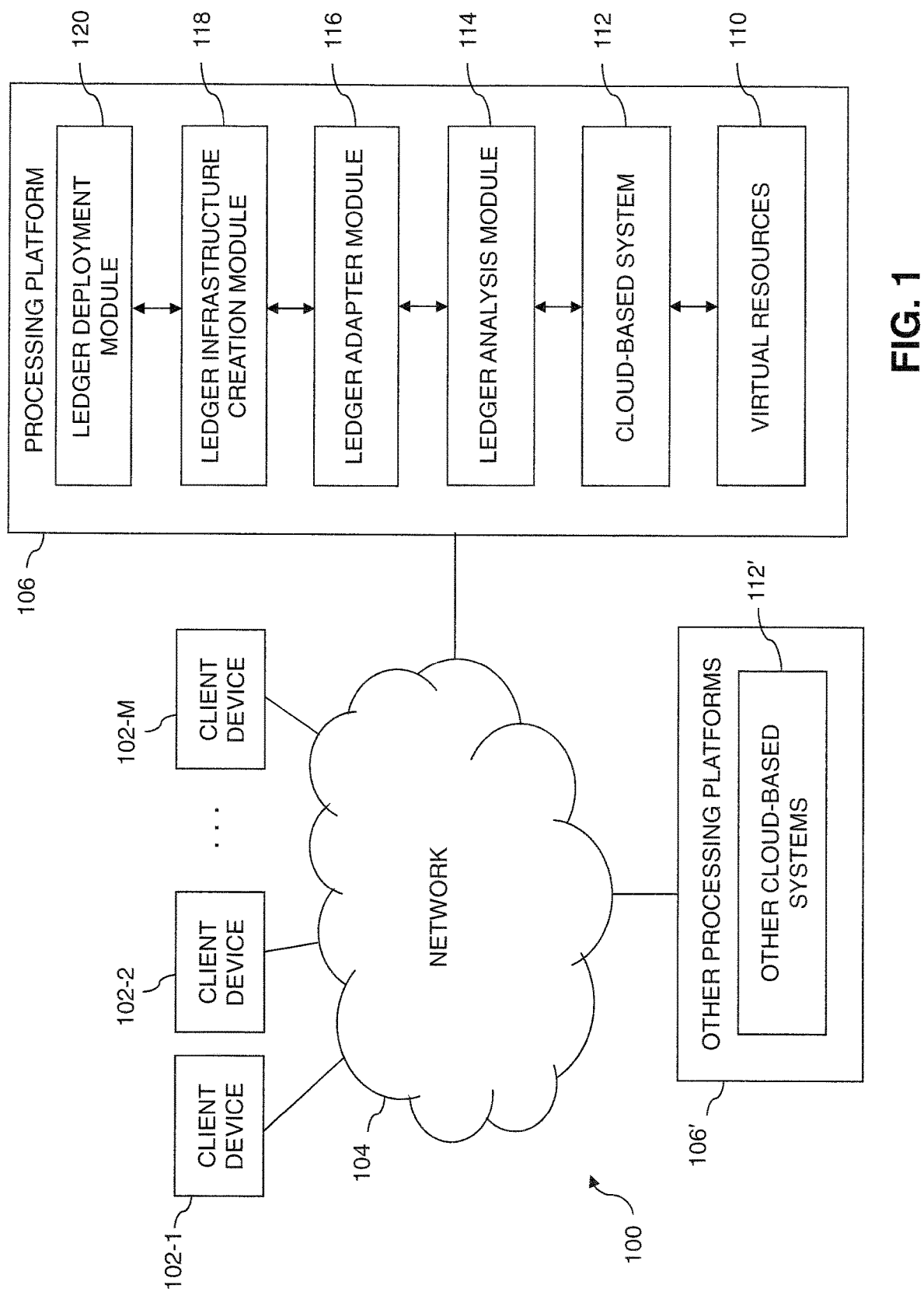
FIG. 1 is a block diagram of an information processing system configured for provisioning, monitoring, and deprovisioning distributed ledger software in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112.

Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises a ledger analysis module 114, a ledger adapter module 116, a ledger infrastructure creation module 118, and a ledger deployment module 120, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The ledger analysis module 114 is configured to identify common operation parameters associated with multiple ledger software offerings and one or more infrastructure components required by the multiple ledger software offerings, wherein the multiple ledger software offerings are distributed across multiple cloud-based systems. The ledger adapter module 116 is configured to map the identified common operation parameters to multiple offering-specific ledger adapters, wherein each respective offering-specific ledger adapter corresponds to a particular ledger software offering. The ledger infrastructure creation module 118 is configured to create at least a portion of multiple infrastructures for implementing the multiple ledger software offerings based on the identified infrastructure components. The ledger deployment module 120 is configured to deploy the multiple ledger software offerings onto the processing platform and to provision, to at least one user, one of the multiple ledger software offerings through the processing platform based on one or more preferences of the at least one user.

An exemplary process utilizing ledger analysis module 114, ledger adapter module 116, ledger infrastructure creation module 118, and ledger deployment module 120 of the processing platform 106 in information processing system 100 will be described in more detail with reference to the flow diagram of FIG. 4.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 5 and 6. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 4.

There are multiple software solutions for providing distributed ledger and blockchain functionality. Accordingly, one or more embodiments of the invention can provide a solution for service providers that aim to deploy and manage distributed ledgers on behalf of customers by abstracting the underlying ledger offering. Such an embodiment allows specific ledger implementations to rise and fall in popularity without impacting the service provider's ability to efficiently deliver specific implementations that customers want.

As detailed herein, at least one embodiment of the invention includes designing and implementing a secure enterprise ledger as a service software module, including the generic application programming interface required to stand-up multiple distributed ledgers, as well as the capabilities to provision on a specific cloud implementation, compile metrics at run-time, and deprovision on a specific cloud implementation.

Figure 2:
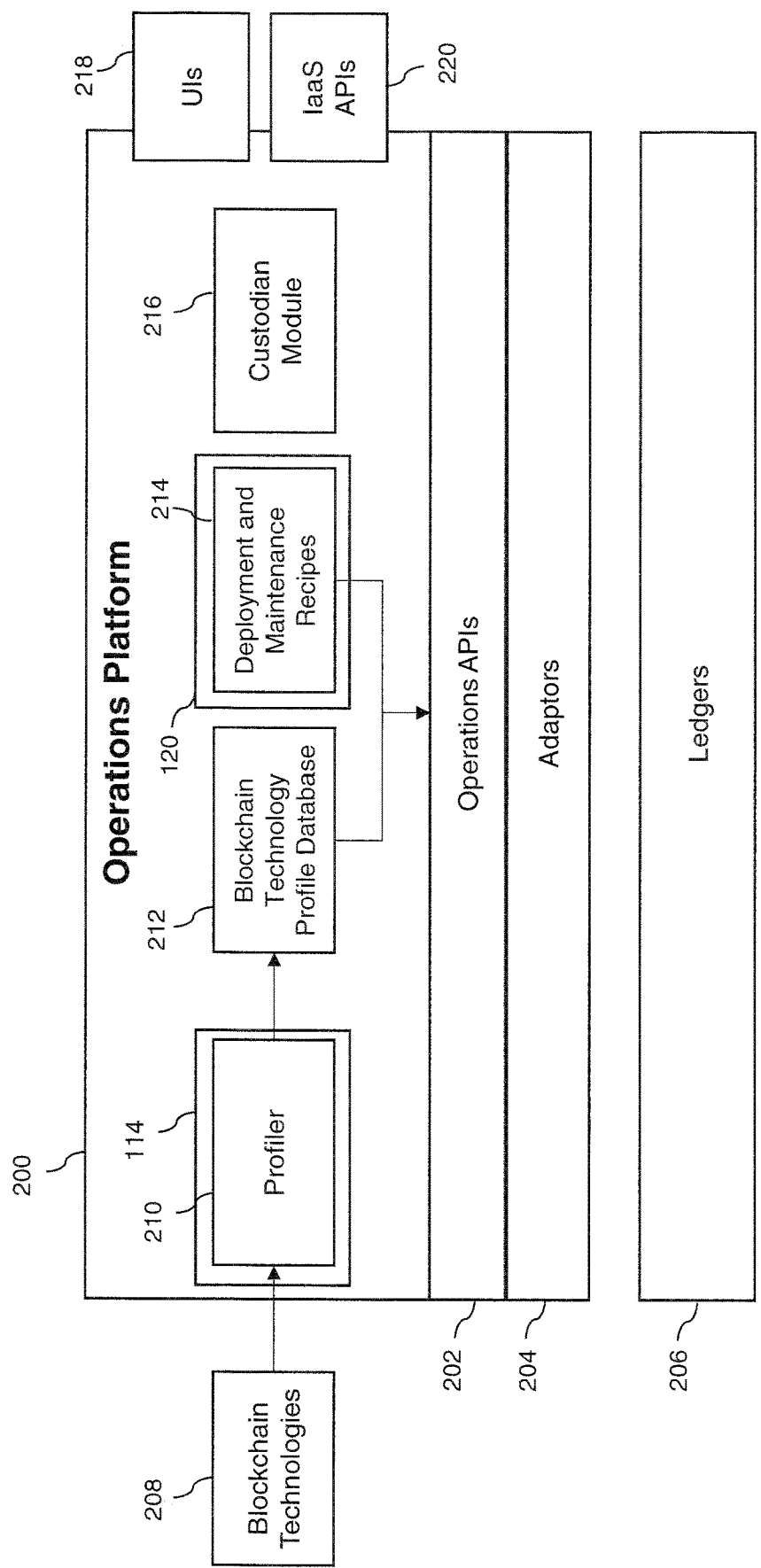
FIG. 2 shows architecture components for a blockchain provisioning, monitoring, and deprovisioning platform in an illustrative embodiment.

FIG. 2 shows architecture components for a blockchain provisioning, monitoring, and deprovisioning platform in an illustrative embodiment. By way of illustration, FIG. 2 depicts an operations platform 200, which functions in conjunction with one or more operations application programming interfaces (APIs) 202, and one or more adaptors 204. Additionally, the operations platform 200 includes a profiler 210 (which can be embodied within ledger analysis module 114 as detailed in FIG. 1), a blockchain technology profile database 212, a deployment and maintenance recipes component 214 (which can be embodied within ledger deployment module 120 as detailed in FIG. 1), a custodian module 216, one or more user interfaces (UIs) 218 and one or more infrastructure as a service (IaaS) APIs 220. As used above and herein, recipes can refer, for example, to blockchain technology specific parameters required for deployment on an infrastructure, such as operation parameters, maintenance parameters, update/upgrade parameters, as well as size and size changing parameters. Additionally, as detailed in FIG. 2, the custodian module 216 keeps and maintains the blockchain- and consortium-relevant information, which are required to operate specific ledgers for consortiums, industries, partners, etc. The custodian module 216 will contain defined rules and policies, references to partners, allowed action lists, etc., and will log activities with regards to custodian duties such as adding members, watching the ledger, etc. Also, industry-specific regulatory and reporting requirements can be enforced and monitored using functions in the custodian module 216.

As illustrated in FIG. 2, a collection of blockchain technologies 208 is obtained by the profiler 210, which generates a profile for each of the technologies and provides the profiles to database 212. The profiles in database 212 as well as the deployment and maintenance recipes 214 are provided to the operations APIs 202, which use such inputs to define the ledger-specific adapters 204 (which correspond to specific ledgers 206) and to create the infrastructure needed by the specific ledgers 206 for implementation. The operations APIs 202 can create such infrastructure using the IaaS APIs 220. For example, if the inputs provided to the operations APIs 202 indicate that a particular ledger requires four virtual machines (VMs), the operations APIs will ask an IaaS API (220) that is principally concerned with making VMs and network constructs and storage to create four VMs of proper size and specifications. Subsequently, by way of further example, the operations APIs 202 can carry out ledger-specific tasks, such as creating a user, issuing a key, starting the node, etc.

Figure 3:
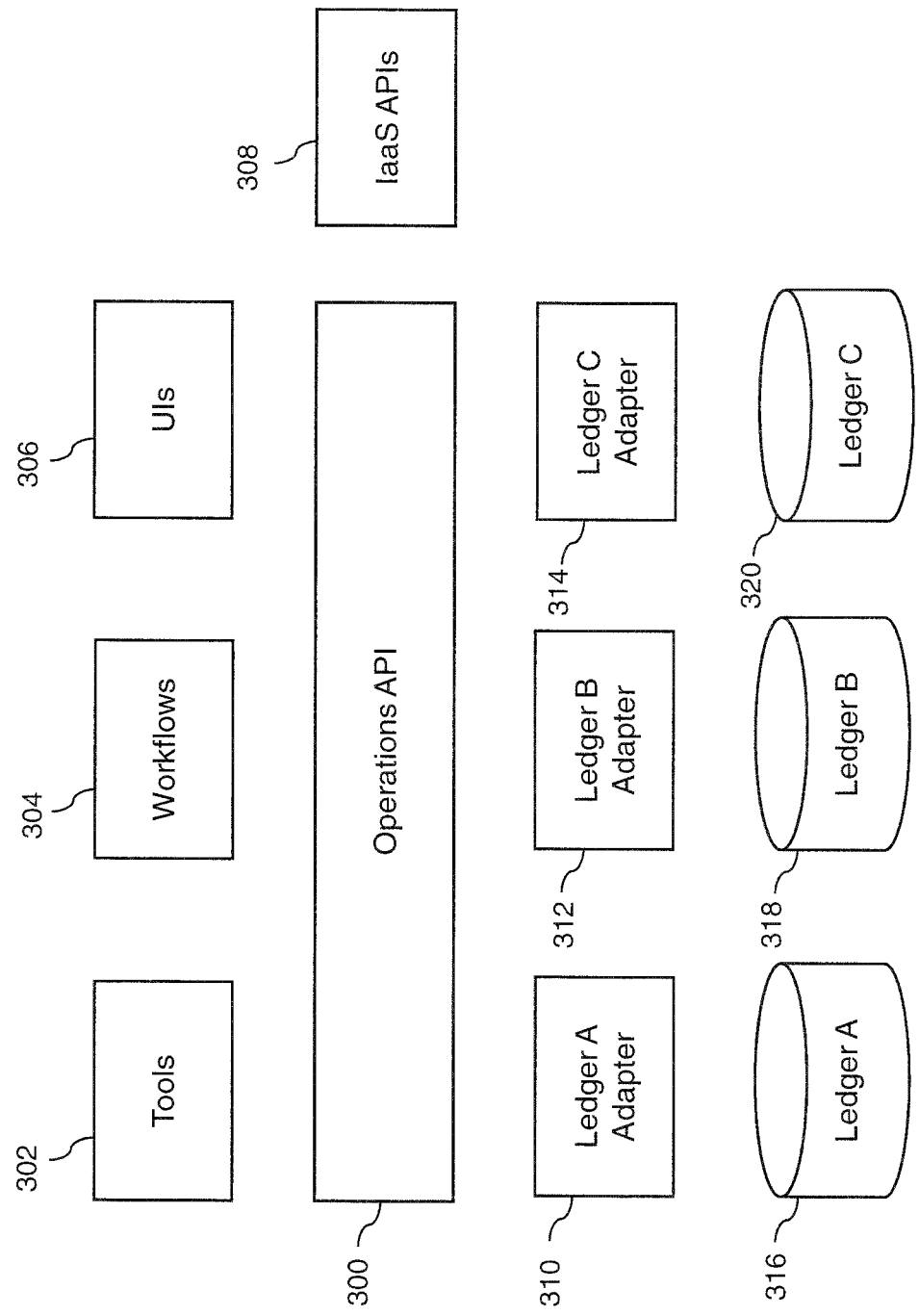
FIG. 3 shows example components within a blockchain provisioning, monitoring, and deprovisioning platform in an illustrative embodiment.

FIG. 3 shows example components within a blockchain provisioning, monitoring, and deprovisioning platform in an illustrative embodiment. By way of illustration in FIG. 3, and as further detailed herein, implementation of each of multiple ledgers (such as ledger A 316, ledger B 318, and ledger C 320) is different, but a variety of operational functions are generic across the ledgers. Accordingly, an operations API 300 can take generic parameters and map such parameters to specific ledger adapters (such as ledger A adapter 310, ledger B adapter 312, and ledger C adapter 314), while also creating ledger-required infrastructure using IaaS APIs 308. Further, UIs 306, tools 302 (such as scripts), and outer workflows 304 can use the operations API 300 to deliver a ledger matching a customer's preference.

By way merely of illustration and not limitation, consider the following scenarios and/or use cases of implementation of one or more embodiments of the invention. For example, consider an infrastructure support engineer (ISE) that receives a request to stand-up a distributed ledger for a customer. Via one or more embodiments of the invention, the ISE can create a script that uses an API in a language in which he or she is comfortable, and the ledger parameters can be provided therein. The ISE can then also use the script for future deployments. Also, some customers may want differing underlying ledger implementations, and for such customers, the ISE can leverage the existing script.

Additionally, consider another example wherein customers want transactions to be confirmed within a certain amount of time to satisfy performance requirements of their ledger consortium. In such an instance, the metrics by one or more embodiments of the invention can be queried to determine whether adjustments must be made.

Further, consider yet another example wherein an ISE receives a request to deprovision a distributed ledger for a customer. Via one or more embodiments of the invention, the ISE can create a script that uses an API in a language with which he or she is comfortable, and the ledger and customer parameters are provided therein. The ISE can then use the script for future deprovisioning. Also, while some separate and/or future customers might be using different underlying ledger implementations, the ISE will still be able to leverage the existing script.

As noted herein, the operation of the information processing system 100 is described in further detail with reference to the flow diagram of the example embodiment of FIG. 4. The process as shown includes steps 400 through 412, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 400, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 402, at least a portion of at least one of multiple cloud-based systems are implemented within the processing platform. For example, with reference to the FIG. 1 embodiment, virtual resources 110 of cloud-based system 112 are implemented within the processing platform 106. As mentioned previously, such portions of cloud-based systems (or virtual resources) illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 404, common operation parameters associated with multiple ledger software offerings are identified and one or more infrastructure components required by the multiple ledger software offerings are identified, wherein the multiple ledger software offerings are distributed across the multiple cloud-based systems. Such a step can be carried out, for example, by ledger analysis module 114 in the FIG. 1 embodiment.

In step 406, the identified common operation parameters are mapped to multiple offering-specific ledger adapters, wherein each respective offering-specific ledger adapter corresponds to a particular ledger software offering. Such a step can be carried out, for example, by ledger adapter module 116 in the FIG. 1 embodiment.

In step 408, at least a portion of multiple infrastructures for implementing the multiple ledger software offerings are created based on the one or more identified infrastructure components. Such a step can be carried out, for example, by ledger infrastructure creation module 118 in the FIG. 1 embodiment. The portion(s) of multiple infrastructures can include, for example, one or more virtual machines of pre-determined size. In at least one embodiment of the invention, the ledger infrastructure creation module can be further configured to create at least a portion of multiple infrastructures for implementing the multiple ledger software offerings using one or more infrastructure as a service application programming interfaces.

In step 410, the multiple ledger software offerings are deployed onto the processing platform. Such a step can be carried out, for example, by ledger deployment module 120 in the FIG. 1 embodiment. In step 412, one of the multiple ledger software offerings are provisioned to at least one user through the processing platform based on one or more preferences of the at least one user. Such a step can also be carried out, for example, by ledger deployment module 120 in the FIG. 1 embodiment.

In at least one embodiment of the invention, the ledger deployment module can be further configured to deprovision the provisioned ledger software offering and to return one or more resources associated with the at least one user from the provisioned ledger software offering to the processing platform. Additionally, the ledger deployment module can be further configured to provide an interactive application programming interface accessible over hypertext transfer protocol. Further, the ledger adapter module is further configured to implement, in the multiple offering-specific ledger adapters, offering-specific functions including creating new users, issuing keys, and/or starting nodes.

Additionally, in one or more embodiments of the invention, the ledger deployment module can be further configured to compile one or more run-time metrics of the provisioned ledger software offering, and to output the one or more run-time metrics to a data repository. Such run-time metrics can include at least one of blockheight, number of connected nodes, proof of work statistics, total number of transactions, one or more performance statistics, and summary issuance information.

Figure 4:
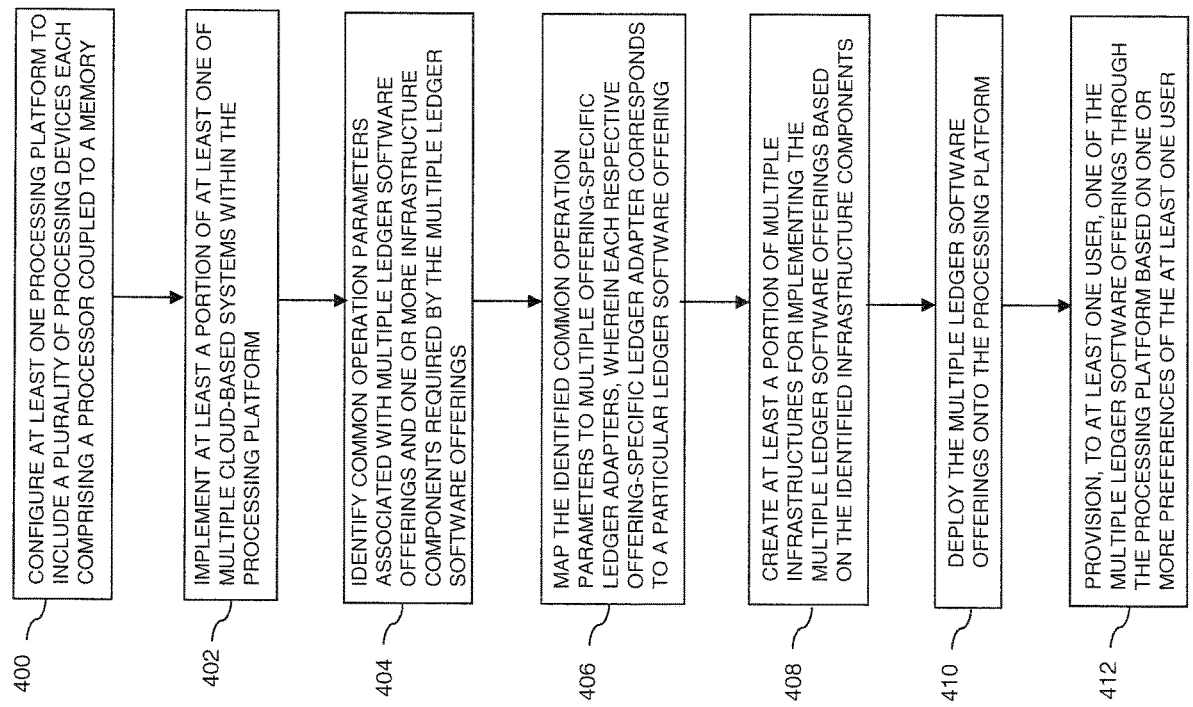
FIG. 4 is a flow diagram of a process for provisioning distributed ledger software in an illustrative embodiment.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of provisioning, monitoring, and deprovisioning distributed ledger software as disclosed herein can provide a number of significant advantages relative to conventional arrangements.

For example, some embodiments can advantageously provide distributed ledger hosting capabilities via a service software module. Also, one or more embodiments can provide a generic application programming interface required to stand-up a distributed ledger, provisioning on a specific cloud implementation, metric-gathering at run-time, and deprovisioning on a specific cloud implementation.

Such arrangements overcome the difficulties that would otherwise be associated with existing approaches that stand-up each individual ledger manually.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
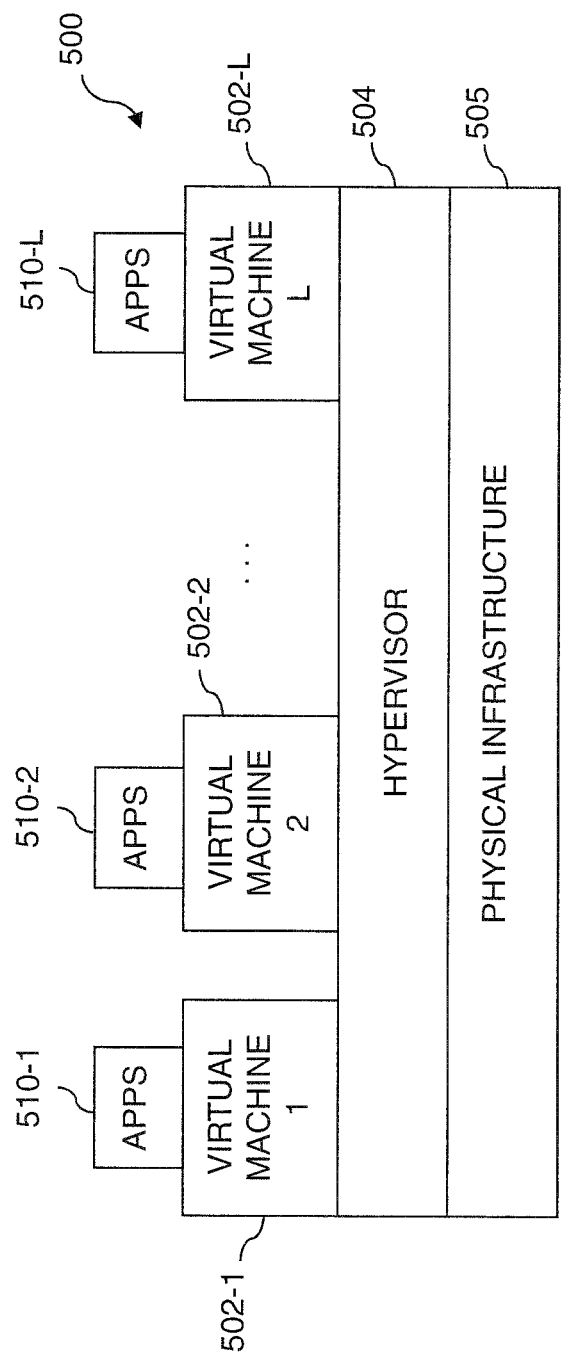
FIGS. 5 and 6 show examples of processing platforms that may be utilized to implement at least a portion of an information processing system in illustrative embodiments.
Figure 6:
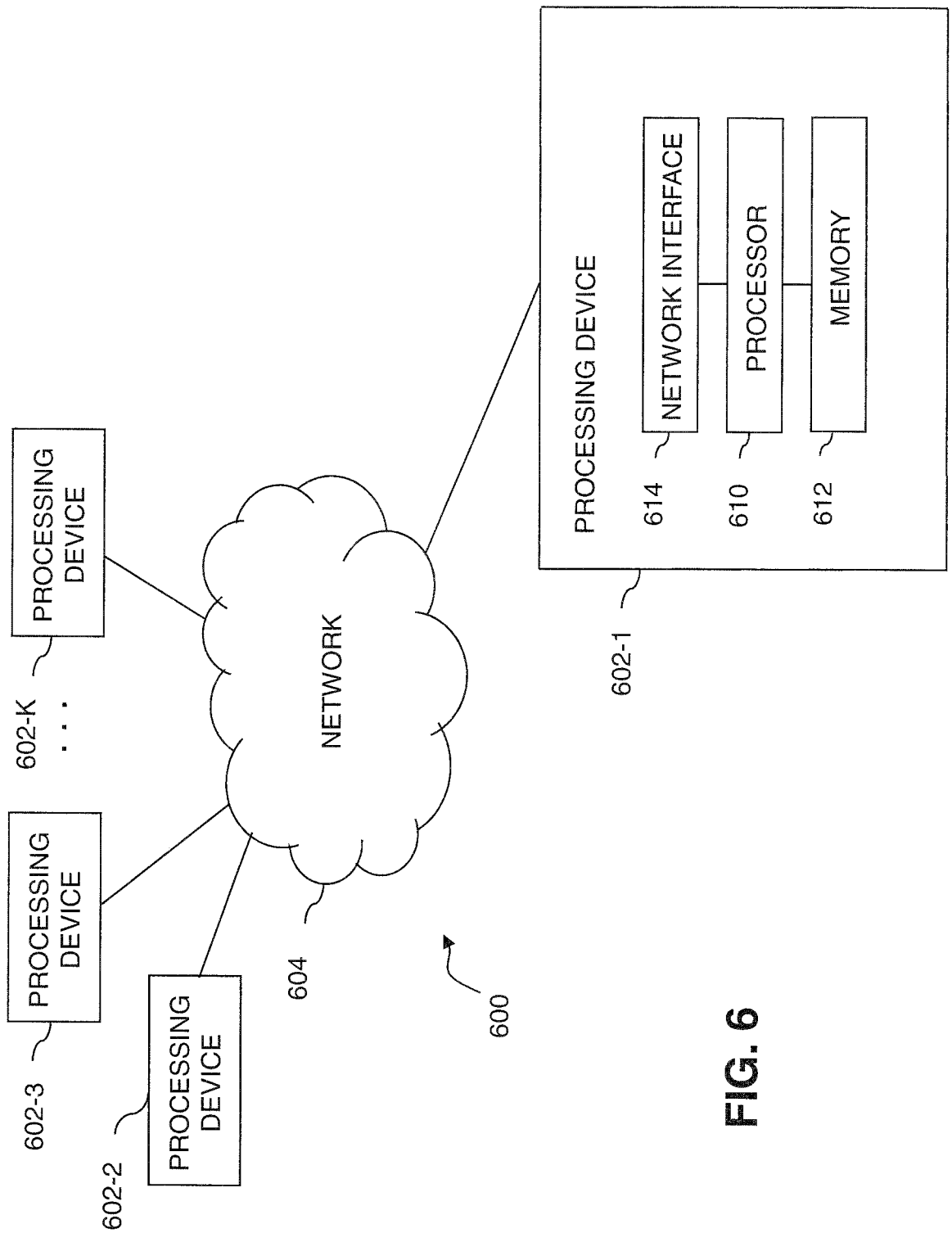

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises VMs 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provision a variety of distributed ledgers through an abstraction layer. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising a plurality of processing devices each comprising a processor coupled to a memory;
   the at least one processing platform being configured to implement at least a portion of at least one of multiple cloud-based systems;
   wherein the at least one processing platform is:
   configured to identify common operation parameters associated with multiple ledger software offerings and to identify one or more infrastructure components required by the multiple ledger software offerings, wherein the multiple ledger software offerings are distributed across the multiple cloud-based systems;
   configured to map the identified common operation parameters to multiple offering-specific ledger adapters, wherein each respective offering-specific ledger adapter corresponds to a particular ledger software offering;
   configured to create at least a portion of multiple infrastructures for implementing the multiple ledger software offerings based on the one or more identified infrastructure components;
   configured to deploy the multiple ledger software offerings onto the at least one processing platform;
   configured to provision, to at least one user, one of the multiple ledger software offerings through the at least one processing platform based on one or more preferences of the at least one user;
   configured to deprovision the provisioned ledger software offering on a specific one of the multiple cloud-based systems in response to a deprovisioning request from at least one user associated with the specific one of the multiple cloud-based systems, wherein deprovisioning comprises at least one of generating and reusing a script that utilizes at least one application programming interface conforming to one or more user preferences; and configured to return one or more resources associated with the at least one user from the provisioned ledger software offering to the at least one processing platform.

2. The apparatus of claim 1, wherein the at least one processing platform is further configured to provide an interactive application programming interface accessible over hypertext transfer protocol.

3. The apparatus of claim 1, wherein the at least one processing platform is further configured to implement, in the multiple offering-specific ledger adapters, offering-specific functions comprising creating new users.

4. The apparatus of claim 1, wherein the at least one processing platform is further configured to implement, in the multiple offering-specific ledger adapters, offering-specific functions comprising issuing keys.

5. The apparatus of claim 1, wherein the at least one processing platform is further configured to implement, in the multiple offering-specific ledger adapters, offering-specific functions comprising starting nodes.

6. The apparatus of claim 1, wherein the at least one processing platform is further configured to create at least a portion of multiple infrastructures for implementing the multiple ledger software offerings using one or more infrastructure as a service application programming interfaces.

7. The apparatus of claim 1, wherein the at least a portion of multiple infrastructures comprises one or more virtual machines of pre-determined size.

8. The apparatus of claim 1, wherein the at least one processing platform is further configured to compile one or more run-time metrics of the provisioned ledger software offering.

9. The apparatus of claim 8, wherein the one or more run-time metrics comprises at least one of blockheight, number of connected nodes, proof of work statistics, total number of transactions, one or more performance statistics, and summary issuance information.

10. The apparatus of claim 8, wherein the at least one processing platform is further configured to output the one or more run-time metrics to a data repository.

11. A method comprising:
identifying common operation parameters associated with multiple ledger software offerings and identifying one or more infrastructure components required by the multiple ledger software offerings, wherein the multiple ledger software offerings are distributed across multiple cloud-based systems, and wherein said identifying is implemented by at least one hardware processor of at least one processing platform;

mapping the identified common operation parameters to multiple offering-specific ledger adapters, wherein each respective offering-specific ledger adapter corresponds to a particular ledger software offering, and wherein said mapping is implemented by at least one hardware processor of the at least one processing platform;

creating at least a portion of multiple infrastructures for implementing the multiple ledger software offerings based on the one or more identified infrastructure components, wherein said creating is implemented by at least one hardware processor of the at least one processing platform;

deploying the multiple ledger software offerings onto the at least one processing platform, wherein said deploying is implemented by at least one hardware processor of at the least one processing platform;

provisioning, to at least one user, one of the multiple ledger software offerings through the at least one processing platform based on one or more preferences of the at least one user, wherein said provisioning is implemented by at least one hardware processor of at the least one processing platform;

deprovisioning the provisioned ledger software offering on a specific one of the multiple cloud-based systems in response to a deprovisioning request from at least one user associated with the specific one of the multiple cloud-based systems, wherein deprovisioning comprises at least one of generating and reusing a script that utilizes at least one application programming interface conforming to one or more user preferences, and wherein said deprovisioning is implemented by at least one hardware processor of at the least one processing platform; and returning one or more resources associated with the at least one user from the provisioned ledger software offering to the at least one processing platform, wherein said returning is implemented by at least one hardware processor of at the least one processing platform;

wherein the at least one processing platform is configured to include at least one hardware processor coupled to at least one memory; and wherein the at least one processing platform is configured to implement at least a portion of at least one of the multiple cloud-based systems.

12. The method of claim 11, further comprising:
providing an interactive application programming interface accessible over hypertext transfer protocol.

13. The method of claim 11, further comprising:
creating at least a portion of multiple infrastructures for implementing the multiple ledger software offerings using one or more infrastructure as a service application programming interfaces.

14. The method of claim 11, further comprising:
compiling one or more run-time metrics of the provisioned ledger software offering.

15. A computer program product comprising a non-transitory processor-readable storage medium having stored therein program code of one or more software programs, wherein the program code when executed by a processing platform comprising a plurality of processing devices causes the processing platform:

to identify common operation parameters associated with multiple ledger software offerings and to identify one or more infrastructure components required by the multiple ledger software offerings, wherein the multiple ledger software offerings are distributed across multiple cloud-based systems;

to map the identified common operation parameters to multiple offering-specific ledger adapters, wherein each respective offering-specific ledger adapter corresponds to a particular ledger software offering;

to create at least a portion of multiple infrastructures for implementing the multiple ledger software offerings based on the one or more identified infrastructure components:

to deploy the multiple ledger software offerings onto the processing platform;

to provision, to at least one user, one of the multiple ledger software offerings through the processing platform based on one or more preferences of the at least one user;

to deprovision the provisioned ledger software offering on a specific one of the multiple cloud-based systems in response to a deprovisioning request from at least one user associated with the specific one of the multiple cloud-based systems, wherein deprovisioning comprises at least one of generating and reusing a script that utilizes at least one application programming interface conforming to one or more user preferences; and to return one or more resources associated with the at least one user from the provisioned ledger software offering to the processing platform;

wherein the processing platform is configured to implement at least a portion of at least one of the multiple cloud-based systems.

16. The computer program product of claim 15, wherein the program code further causes the processing platform:

to provide an interactive application programming interface accessible over hypertext transfer protocol.

17. The computer program product of claim 15, wherein the program code further causes the processing platform:

to create at least a portion of multiple infrastructures for implementing the multiple ledger software offerings using one or more infrastructure as a service application programming interfaces.

18. The computer program product of claim 15, wherein the program code further causes the processing platform:

to implement, in the multiple offering-specific ledger adapters, offering-specific functions comprising one or more of creating new users, issuing keys, and starting nodes.

19. The method of claim 14, further comprising:

outputting the one or more run-time metrics to a data repository.

20. The method of claim 11, further comprising:

implementing, in the multiple offering-specific ledger adapters, offering-specific functions comprising one or more of creating new users, issuing keys, and starting nodes.

\* \* \* \* \*